United States Patent Office 2,819,276
Patented Jan. 7, 1958

2,819,276
3,19-DIHYDROXY-4-ANDROSTEN-17-ONE

Joseph S. Mihina, Skokie, Ill., assignor to G. D. Searle & Co., Chicago, Ill., a corporation of Delaware No Drawing. Application August 27, 1956
Serial No. 606,199

1 Claim. (Cl. 260—397.4)

The present invention relates to 3,19-dihydroxy steroids and more particularly to 3,19-dihydroxy-4-androsten-17-one. This compound has the structural formula

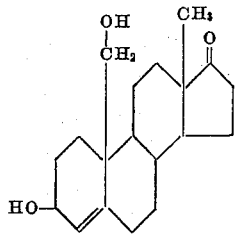

The synthesis of this compound can be accomplished by a variety of processes. Thus the 19-desoxy compound can be subjected to a biochemical oxidation by a microorganism or by an adrenal enzyme system.

Alternatively, 17,19,21-trihydroxyprogesterone can be reduced with sodium borohydride to yield 4-pregnene-3,17,19,20,21-pentol which can then be treated with periodic acid to yield 3,19-dihydroxy-4-androsten-3-one.

The 3,19-dihydroxy steroids of this invention are highly useful intermediates in the preparation of physiologically actvie 19-hydroxy steroids and 19-norsteroids. 3,19-dihydroxy-4-androsten-17-one also has estrogenic properties.

3,19-dihydroxy-4-androsten-17-one can be ethynylated to yield 17α-ethynyl-4-androsten-3,17,19-triol, which in turn can be hydrogenated first to the corresponding 17α-vinyl and then to 17α-ethyl-4-androsten-3,17,19-triol, a compound possessing progestational activity.

The 3,19-dihydroxy steroids of the type

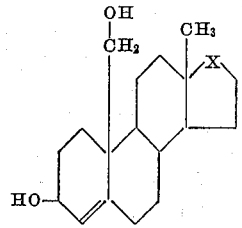

wherein X can represent a group of the type

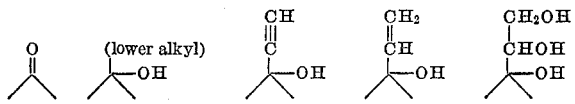

can be oxidized to the corresponding 3-one by treatment with manganese dioxide. The resulting 3-ketones can be converted to 19-nor 4-androsten-3-one derivatives of the general type

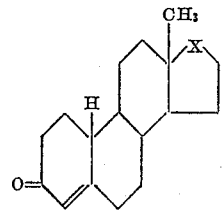

wherein X is defined as hereinabove by treatment with strong alkali. The resulting 19-norsteroids are known to have many useful activities including anabolic and hypotensive action.

This invention is disclosed, in further detail, by the following examples which represent specific embodiments of this invention without, however, limiting it in spirit or in scope. The amounts of materials are given in parts by weight and temperatures are given in degrees centigrade (° C.).

Example 1

In a high-speed blender 1000 parts of frozen beef adrenal glands are homogenized with 3000 parts of an ice-cold isotonic phosphate buffer solution of sodium dihydrogen phosphate and disodium hydrogen phosphate of neutral pH for 40 seconds and then centrifuged at 5000× g for 25 minutes. The residue thus obtained is washed twice with isotonic phosphate buffer solution and then suspended in 800 parts of a mixture (6:1:3 by volume) of aqueous 0.17 molar sodium malate, 0.12 molar magnesium chloride and 0.1 molar sodium phosphate solution. With this homogenate preparation, 1 part of 3β-hydroxy-4-androstene-17-dione in 40 parts of propylene glycol is incubated with shaking at 37.5° C. for one hour, the gas phase being air.

The resulting incubate is poured into 7900 parts of acetone and stirred for 2 hours at 4° C. The residue is collected on a suction filter, homogenized in acetone and stirred in 2200 parts of acetone for two hours and allowed to stand for 15 hours at 4° C. A third extraction of the tissue with 1000 parts of acetone is carried out in the same manner.

The combined acetone extracts of the incubate are brought to dryness under vacuum and the resulting residue is applied to a silica gel chromatography column in a benzene-hexane solution. The column is developed with mixtures of benzene and ethyl acetate containing increasing concentrations of ethyl acetate. The eluate containing 30% ethyl acetate and 70% benzene is concentrated and the residue is crystallized from a mixture of 5% ethyl acetate and 95% petroleum ether to yield 3β,19-dihydroxy-4-androsten-17-one melting at about 120–128° C.

Example 2

To a solution of 100 parts of 17,19,21-trihydroxyprogesterone and 100 parts of 80% tertiary butanol are added 104 parts of sodium borohydride. The resulting solution is allowed to stand at room temperature for six hours after which the excess sodium borohydride is decomposed by the addition of 50 parts of a 50% solution of acetic acid. The aqueous solution is exhaustively extracted with dichloromethane. This extract is washed with two 10,000 part portions of water. The dichloromethane solution and the water wash solutions are collected on a filter and dried. Additional yield is obtained by concentration of the dichloromethane solution. 4-pregnene-3,17,19,20,21-pentol is thus obtained as a hydrate by crystallization from a mixture of 20% methanol and 80% ethyl acetate. After vacuum drying crystals melting at about 200–201° C. are obtained. The infrared absorption spectrum shows maxima at about 2.96, 6.02, 6.95, 7.34, 7.62, 7.91, 8.2, 8.38, 9.1, 9.57, 9.91, 10.14, 10.23, 10.75, 11.20, 11.56, 12.0, and 12.83 microns.

Example 3

To a solution of 4.5 parts of 4-pregnene-3,17,19,20,21-pentol in 650 parts of methanol are added 10 parts of periodic acid dihydrate in 250 parts of water. The solution is allowed to stand for 20 hours at room temperature after which the methanol is removed under vacuum. The aqueous solution is extracted with dichloromethane. This extract is washed with water, dehydrated under vacuum, and upon evaporation of the solvent a residue is obtained which is dissolved in benzene and chromatographed over silica gel. The column is developed with benzene solutions containing increasing concentrations of ethyl acetate. The eluate containing 30% ethyl acetate is concentrated and the residue is crystallized from a mixture containing 5% ethyl acetate and 95% petroleum ether to yield 3,19-dihydroxy-4-androsten-17-one melting at about 126–128° C. Infrared maxima are observed at about 2.83, 5.78, 6.02, 6.82, 6.92, 7.14, 7.31, 7.55, 7.92, 8.36, 8.60, 9.02, 9.19, 9.43, 9.73, 10.46, 10.93, 11.18, 11.43, and 12 microns.

*Example 4*

Dry acetylene is bubbled into a mixture of 12.5 parts of 3-M methyl magnesium bromide in ether and 50 parts of tetrahydrofuran. To 14.3 parts of the resulting solution of ethynyl magnesium bromide are added 0.23 part of 3,19-dihydroxy-4-androsten-17-one and 7 parts of tetrahydrofuran. The reaction mixture is refluxed for fifteen minutes, chilled and treated with 2.6 parts of concentrated sulphuric acid and 67.5 parts of water. The resulting mixture is extracted with dichloromethane and the extract is washed with water, dried over anhydrous sodium sulfate, and concentrated to dryness under vacuum. The residue is dissolved in benzene and the solution is applied to a silica gel chromatography column. The column is developed with benzene solutions containing increasing concentrations of ethyl acetate. The eluate obtained with a 35% solution of ethyl acetate in benzene is concentrated to yield 17α-ethynyl-4-androstene-3,17,19-triol which melts at approximately 213–217° C.

*Example 5*

A solution of 172 parts of 3,19-dihydroxy-4-androsten-17-one, and 5 parts of tetrahydrofuran is added to a mixture of one part of a 3-M solution of ethyl magnesium bromide in ether and 2 parts of tetrahydrofuran maintained at 0–5° C. with stirring. Stirring is continued for 4 hours, during which time the solution is permitted to reach room temperature. After 12 hours standing 5 parts of 3-N hydrochloric acid are added to decompose the Grignard complex. The mixture is then extracted with dichloromethane and the extract is washed with water and dried over anhydrous sodium sulfate. The solvent is evaporated and the residue is dissolved in benzene and applied to a silica gel chromatography column. The column is washed with benzene and benzene solutions containing increasing concentrations of ethyl acetate. Elution with a 30% solution of ethyl acetate in benzene, concentration of the eluate and crystallization of the residue from acetone and petroleum yields 17α-ethyl-4-androstene-3,17,19-triol. The resulting product is dissolved in chloroform and shaken at room temperature with manganese dioxide for 22 hours. The mixture is then filtered and after washing of the filter cake with chloroform and methanol the filtrate is taken to dryness. On crystallization of the residue from a mixture of acetonitrile and benzene there is obtained 17α-ethyl-17,19-dihydroxy-4-androsten-3-one. The infrared absorption spectrum shows maxima at 2.83, 6.02, 6.19, and 9.41 microns. This compound is identical with one of the products obtained by adrenal perfusion of ethyltestosterone.

A solution of 3 parts of 17α-ethyl-17,19-dihydroxy-4-androsten-3-one in 5 parts of ethanol or a similar lower alkanol is treated with 10 parts of a 3.2-N aqueous potassium hydroxide solution and after standing at room temperature for three hours is neutralized with acetic acid. The alcohol is removed under vacuum and the residue is diluted with water and extracted with dichloromethane. The residue thus obtained is dissolved in benzene and applied to a silica gel chromatography column. The column is washed with benzene and then with benzene solutions containing increasing concentrations of ethyl acetate. Elution with a 15% solution of ethyl acetate in benzene, concentration of the resulting eluate under vacuum and recrystallization from methanol yields 17-ethyl-19-nortestosterone melting at about 140–141° C.

*Example 6*

A solution of 41 parts of 4-pregnene-3,17,19,20,21-pentol in 10,000 parts of chloroform is shaken at room temperature with 300 parts of manganese dioxide for 22 hours. The reaction mixture is then filtered and the filter cake is washed with chloroform and methanol. The combined filtrate and washings are concentrated to dryness under vacuum. The residue is dissolved in ethyl acetate and 4 times of the weight of the resulting solution is added in benzene. This solution is applied to a silica gel chromatography column and washed with benzene solutions containing increasing concentrations of ethyl acetate. Elution with an 85% solution of ethyl acetate in benzene, concentration under vacuum and crystallization from petroleum ether and acetone yields 17,19,20,21-tetrahydroxy-4-androsten-3-one melting at about 199–201° C. The infrared absorption spectrum shows maxima at 2.91, 6.06, 6.92, 7.35, 7.78, 8.12, 9.2, 9.41, 9.62, 10.19, 11.20, and 11.39 microns.

The other 3,19-dihydroxy-4-androstene derivatives described herein can be converted to the corresponding 19-hydroxy-4-androsten-3-ones by use of manganese dioxide in the identical manner. Thus 3,19-dihydroxy-4-androsten-17-one yields 19-hydroxy-4-androstene-3,17-dione melting at about 169–170° C. after recrystallization from acetone and ether.

What is claimed is:
3,19-dihydroxy-4-androsten-17-one.

No references cited.

U. S. DEPARTMENT OF COMMERCE
PATENT OFFICE

CERTIFICATE OF CORRECTION

Patent No. 2,819,276                                        January 7, 1958

Joseph S. Mihina

It is hereby certified that error appears in the printed specification of the above numbered patent requiring correction and that the said Letters Patent should read as corrected below.

Column 1, line 36, for "actvie" read -- active --; column 2, line 55, after "solutions are" insert -- allowed to stand for 12 hours after which the crystals are --.

Signed and sealed this 4th day of March 1958.

(SEAL)
Attest:

KARL H. AXLINE
Attesting Officer

ROBERT C. WATSON
Commissioner of Patents